United States Patent [19]
Harasaki

[11] Patent Number: 4,763,948
[45] Date of Patent: Aug. 16, 1988

[54] AUTOMOBILE FRONT BODY CONSTRUCTION

[75] Inventor: Hayatsugu Harasaki, Hiroshima, Japan

[73] Assignee: Mazda Motor Corporation, Hiroshima, Japan

[21] Appl. No.: 882,242

[22] Filed: Jul. 7, 1986

[30] Foreign Application Priority Data

Jul. 16, 1985 [JP] Japan .................. 60-157779

[51] Int. Cl.⁴ .................................. B62D 25/08
[52] U.S. Cl. ..................... 296/194; 280/785; 296/188
[58] Field of Search .............. 296/194, 188; 280/701, 280/690–696, 701, 666, 724, 785

[56] References Cited

U.S. PATENT DOCUMENTS

| | | | |
|---|---|---|---|
| 3,441,289 | 4/1969 | Frantz et al. | 296/194 |
| 4,406,343 | 9/1983 | Harasaki | 296/194 |
| 4,424,984 | 1/1984 | Shiratori et al. | 280/701 |
| 4,573,734 | 3/1986 | Gass | 296/194 |

FOREIGN PATENT DOCUMENTS 56-105484 8/1981 Japan .
60-287 1/1985 Japan .

Primary Examiner—Robert R. Song
Attorney, Agent, or Firm—Burns, Doane, Swecker & Mathis

[57] ABSTRACT

An automobile front body structure having an engine compartment defined therein, and also having a pair of spaced first longitudinal frames extending beneath the engine compartment in a direction longitudinally of an automobile and connected at a rear end to a floor panel. The front body structure comprises suspension arm support members secured to front ends of the first longitudinal frames, respectively, for the support of left-hand and right-hand suspension arms, and a transverse connecting member extending between the first longitudinal frames in a direction widthwise of the automobile and having its opposite ends connected to the respective support members.

4 Claims, 4 Drawing Sheets

FIG. 4
FIG. 5
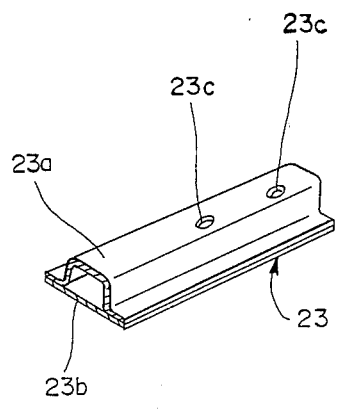
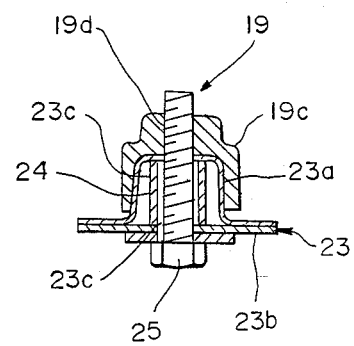
FIG. 7   PRIOR ART
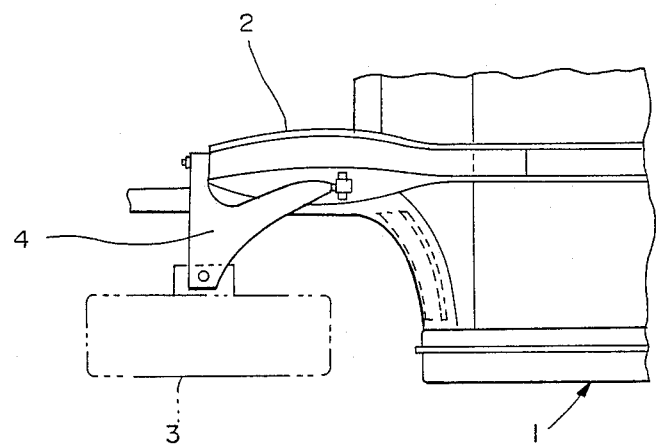

AUTOMOBILE FRONT BODY CONSTRUCTION

BACKGROUND OF THE INVENTION

The present invention relates to an improvement in an automobile front body structure.

The Japanese Laid-Open Utility Model Publication No. 56-105484, published Aug. 17, 1981, discloses an automobile front body structure of a design shown in FIG. 7 of the accompanying drawings. Referring to FIG. 7 which illustrates only a left-hand portion of the front body structure in schematic top plan representation, the front body structure includes a pair of spaced longitudinal side frames 2 extending in a direction lengthwise of an automobile below an engine compartment. The side frames 2 have their front ends to which associated suspension arms 4 for the support of respective front wheel assemblies 3 are connected for elastically pivotal movement in a direction generally perpendicular to the ground surface.

In this prior art front body structure, since each of the free ends of the side frames 2 is supported in cantilever fashion, a portion of the respective side frame where a suspension system is installed has an insufficient physical strength.

SUMMARY OF THE INVENTION

The present invention has been developed with a view to substantially eliminating the above described problem and has for its essential object to provide an improved automobile front body structure wherein reinforcement has been made to provide a sufficient physical strength as well as a rigidity to those portions of the respective longitudinal side frames where the associated suspension systems are installed.

According to the present invention, this object can be accomplished by providing an automobile front body structure having an engine compartment defined therein, and also having a pair of spaced first longitudinal frames extending beneath the engine compartment in a direction longitudinally of an automobile and connected at a rear end to a floor panel, which structure comprises suspension arm support members secured to front ends of the first longitudinal frames, respectively, for the support of left-hand and right-hand suspension arms, and a transverse connecting member extending between the first longitudinal frames in a direction widthwise of the automobile and having its opposite ends connected to the respective support members.

The provision of the transverse connecting member imparts a sufficient physical strength as well as a rigidity to those portions of the first longitudinal frames where the respective suspension systems are installed.

Preferably, the opposite end portions of the transverse connecting member are detachably connected to the respective support members so that, during the servicing and/or repair of the engine and/or transmission, the removal of the transverse connecting member itself can provide a ready access to the engine and/or the transmission from below.

Preferably, for ease of installation, the transverse connecting member is, prior to being mounted on the first longitudinal frames, provided at its opposite ends with the respective support member which are in turn secured to the respective longitudinal frames.

BRIEF DESCRIPTION OF THE DRAWINGS

This and other objects and features of the present invention will become clear from the following description taken in conjunction with a preferred embodiment thereof with reference to the accompanying drawings, in which:

FIG. 4 is a perspective view of a portion of the transverse connecting member;

FIG. 5 is a sectional view showing the joint between the transverse connecting member and the suspension arm support member;

FIG. 7 is a top plan view of only a left-hand portion of the prior art automobile front body structure.

DETAILED DESCRIPTION OF THE EMBODIMENT

Figure 1:
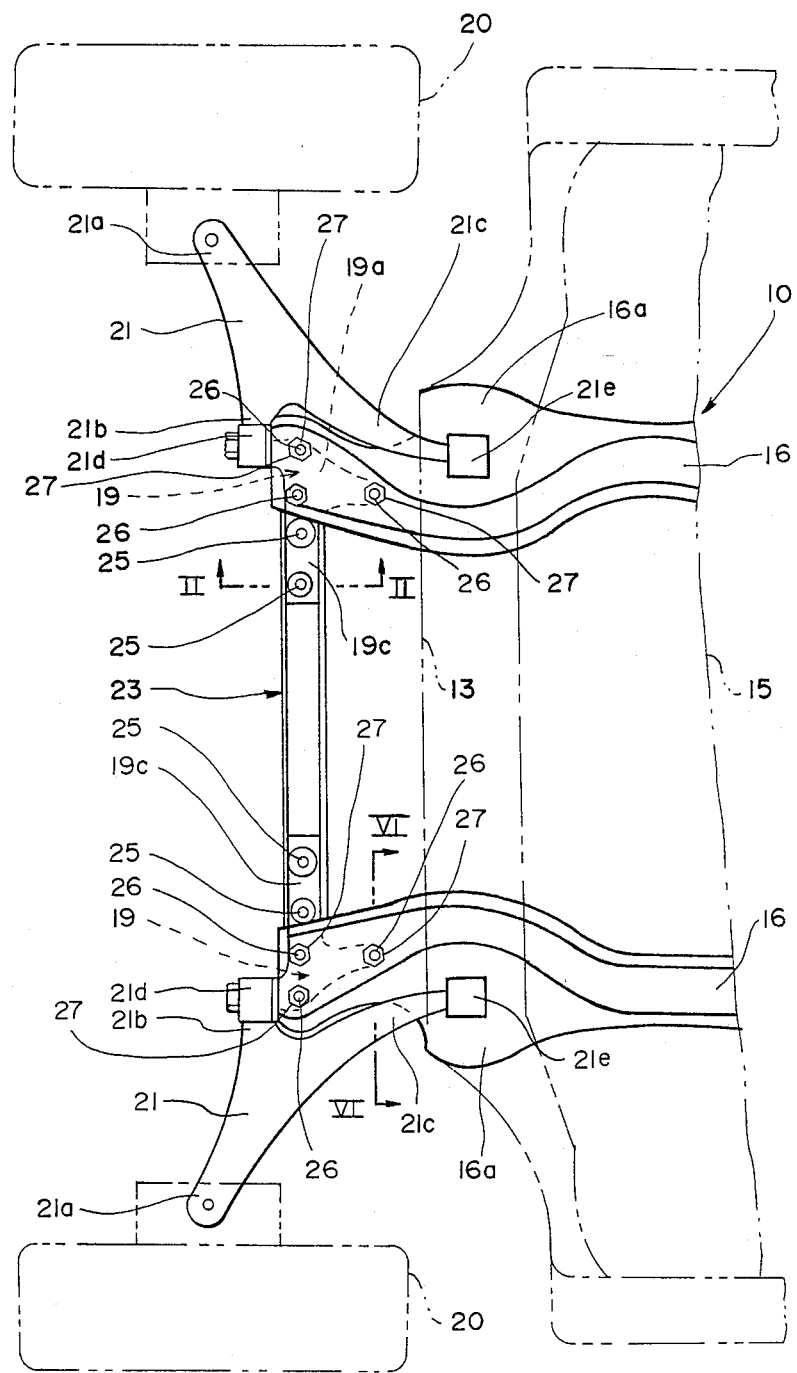
FIG. 1 is a top plan view of an automobile front body structure embodying the present invention.
Figure 2:
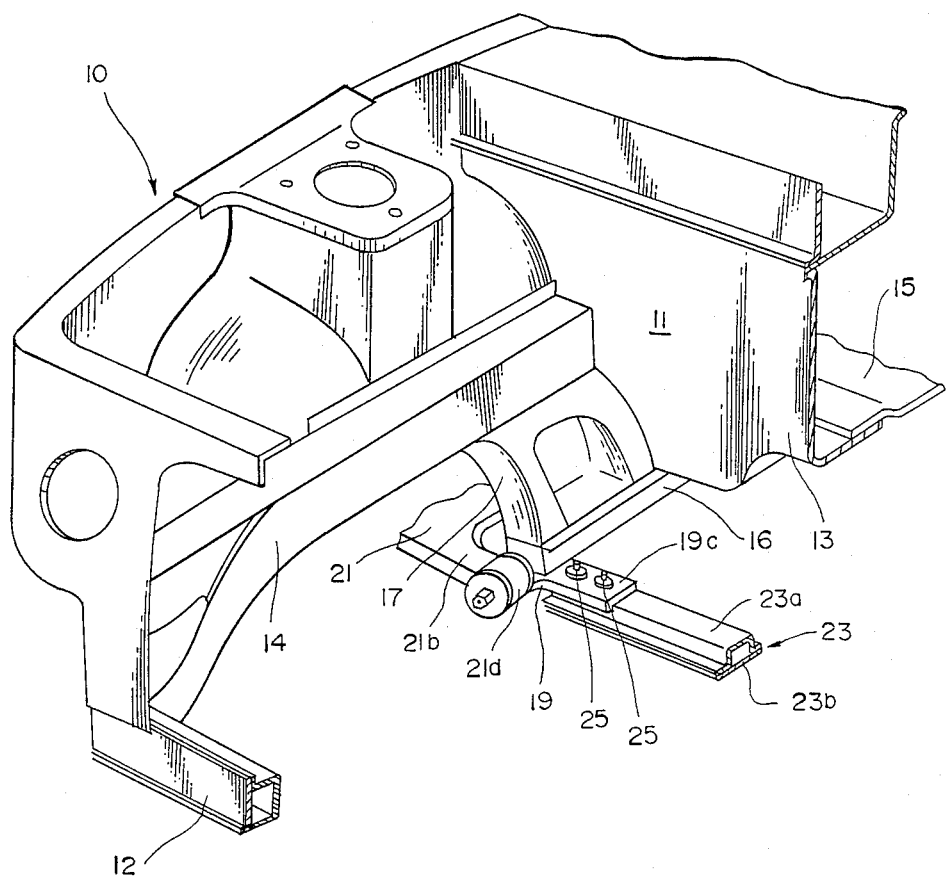
FIG. 2 is a perspective view showing only a right-hand portion of the front body structure, with a portion cut away to show the joint between one end of a transverse connecting member and a right-hand longitudinal frame through a corresponding suspension arm support member.

Referring first to FIGS. 1 and 2, an automobile body structure 10 includes a pair of spaced upper longitudinal frames 14 (only the right-hand upper longitudinal frame being shown in FIG. 2) extending on respective sides of the body structure 10 in a direction longitudinally of the body structure 10, and a pair of spaced lower longitudinal frames 16 extending generally beneath the respective upper longitudinal frames 14 in a direction longitudinally of the body structure 10. A front cross member 12 extends between the left-hand and right-hand upper longitudinal frames 14 with its opposite ends rigidly secured, or otherwise welded, to respective front ends of the upper longitudinal frames 14. Respective rear portions of the upper longitudinal frames 14 are rigidly secured, or welded, to a lower region of a dash panel 13 which is a wall member separating the interior of the body structure 10 into a passengers' compartment (not shown) and an engine compartment 11.

The lower longitudinal frames 16 have their rear end portions rigidly secured, or welded, from below to the lowermost edge of the dash panel 13 and also to a floor panel 15 defining the bottom of the passengers' compartment. The lower longitudinal frames 16 so supported protrude frontwardly from below the dash panel 13 with their front ends terminating spaced a distance rearwardly from the front cross member 12. Within the engine compartment 11, the upper and lower longitudinal frames 14 and 16 are rigidly connected together by means of respective brace members, only the right-hand brace member being shown by 17 in FIG. 2.

Figure 3:
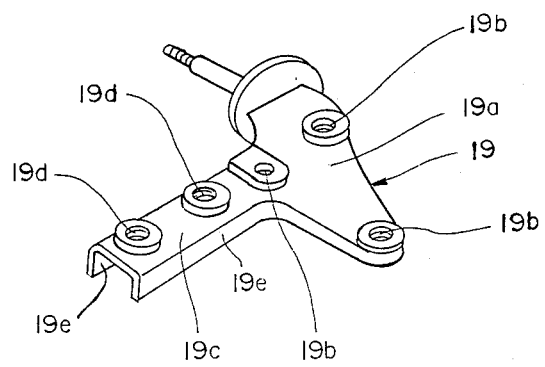
FIG. 3 is a persepctive view, on a somewhat enlarged scale, of the suspension arm support member.

The respective ends of the lower longitudinal frames 16 are connected together through a transverse connecting member 23 by means of generally T-shaped, suspension arm support members 19 employed one for each lower longitudinal frame 16. As best shown in FIG. 3, each of the suspension arm support members 19 is of generally T-shaped configuration having a generally elongated body 19a and a transverse arm 19c integral with and protruding laterally outwardly from the body 19a, said body 19a and said arm 19c having respective pluralities of holes 19b and 19d defined therein as best shown in FIG. 6.

Figure 6:
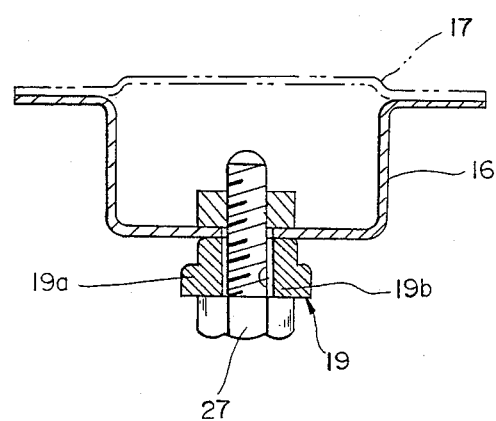
FIG. 6 is a cross-sectional view taken along the line VI—VI in FIG. 1.

The support members 19 are rigidly secured to the front ends of the lower longitudinal frames 16 by means of bolts 26 passing through the holes 19b from below and firmly threaded to respective nuts 27 welded to the front ends of the lower longitudinal frames 16 as shown in FIG. 6, respectively, with the associated transverse arms 19c extending in respective directions close towards, and in alignment with each other. It is to be noted that, for the purpose as will be described later, at least the transverse arm 19c of each of the support members 19 is so shaped as to have a crosssection generally similar to the inverted shape of a figure "U" and, therefore, has a pair of downwardly extending side flanges 19e.

Suspension arms 21 have wheel carrier ends 21a, on which respective front wheel assemblies 20 are mounted, and also have front and rear arm portions 21b and 21c forked from the associated wheel carrier ends 21a. Each suspension arm 21 is pivotally coupled to the adjacent lower longitudinal frame 14 below the engine compartment 11 with the front arm portion 21b mounted on the associated support member 19 through any known pivotable and elastically yieldable bearing member 21d and with the rear arm portion 21c mounted on a laterally outwardly extending flange 16a of the frame 16 through any known pivotable and elastically yieldable bearing member 21e. In assembled condtion, the front wheel assemblies 20 are generally positioned laterally outwardly of the front ends of the respective lower longitudinal frames 16 for pivotal movement in a direction generally perpendicular to the ground surface.

The details of the transverse connecting member 23 and the joint between the transverse arm 19c of each suspension arm support member 19 and the adjacent end of the transverse connecting member 23 will now be described with particular reference to FIGS. 4 and 5. As best shown in FIG. 4, the transverse connecting member 23 is comprised of a channel bar 23a and a flat bar 23b welded together to render the connecting member 23 to have a generally closed hollow. At each end portion of the connecting member 23, the channel bar 23a and the flat bar 23b are formed with aligned through-holes, generally shown by 23c in FIGS. 4 and 5, for the passage of a corresponding number of bolts 25.

As best shown in FIG. 5, each end portion of the connecting member 23 is received from below in the transverse arm 19c of the respective suspension arm support member 19 and is rigidly secured thereto by means of the bolts 25 each inserted from below into the respective aligned through-holes 23c and then firmly threaded into the respective threaded hole 19d in the transverse arm 19c. The use is preferred of spacer sleeves 24 one for each bolt 25, or each aligned through-holes 23c, for avoiding any possible collapse of one or both of the opposite end portions of the connecting member 23, which spacer sleeves 24 are accommodated within the hollow of the connecting member 23 and are fixed in place in alignment with the respective through-holes 23c as shown in FIG. 5.

Thus, the suspension arm support members 19, particularly the transverse arms 19c thereof, are connected together by means of the transverse connecting member 23 extending widthwise of the automobile front body structure, and therefore, respective portions of the lower longitudinal frames 16 where associated suspension systems are installed are reinforced with the physical strength and the rigidity increased.

In the practice of the invention, the opposite end portions of the connecting member 23 may be welded to the respective transverse arms 19c of the support members 19, or may be integrally formed with the respective support members 19. However, the bolted connected is preferred because, during the servicing or repair of the engine and/or the transmission to be done subsequent to the complete assembly of the automobile employing the front body structure according to the present invention, the connecting member 23 can be removed merely by undoing the bolts 25 for the ready access to the engine and/or the transmission from below.

When it comes to the installation of the connecting members 23 to the lower longitudinal frames 16, it will be facilitated if, prior to the support members 19 being bolted to the respective frames 16, the support members 19 are connected to the opposite end portions of the connecting member 23 in the manner as hereinbefore described.

Although the present invention has been described in connection with the preferred embodiment thereof with reference to the accompanying drawings, it is to be noted that various changes and modifications will be readily apparent to those skilled in the art. Unless such changes and modifications depart from the scope of the present invention as defined by the appended claims, they should be understood as included therein.

What is claimed is:

1. An automobile front body structure having an engine compartment defined therein, and also having a pair of spaced first longitudinal frames extending beneath the engine compartment in a direction longitudinally of an automobile and connected at a rear end to a floor panel, which structure comprises:
   suspension arm support members secured to front ends of the first longitudinal frames, respectively, for the support of left-hand and right hand suspension arms;
   a transverse connecting member extending between the first longitudinal frames in a direction widthwise of the automobile and having its opposite ends connected to the respective support members; and
   said support members being of a generally T-shaped configuration having a body, secured to the front end of the first longitudinal frames, respectively, and a transverse arm detachably connected with an adjacent end of the transverse connecting member.

2. The structure as claimed in claim 1, further comprising a pair of spaced second longitudinal frames extending above the respective first longitudinal frames in a direction longitudinally of the automobile and connected at rear portions to a lower region of a dash panel, a front cross member positioned frontwardly of the transverse connecting member and having its opposite ends secured to respective front ends of the second longitudinal frames, and a bracing member for each second longitudinal frame, said 3. The structure as claimed in claim 1, wherein each of the suspension arms is comprised of a wheel carrier end for the support of a front wheel, and a pair of arm portions forked from the wheel carrier end, said arm portions being resiliently displaceably connected to the associated support member through a bearing member and to a laterally outwardly protruding flange of the associated first longitudinal frame through a bearing member whereby the respective suspension arm is pivotable in a direction up and down.

4. The structure as claimed in claim 1, wherein at least the arm portion of each of the support members has a pair of opposite, downwardly extending flanges so shaped as to render the respective arm portion to have cross-section generally similar in shape to the inverted shape of a figure "U", and wherein said transverse connecting member is comprised of a channel bar and a flat bar joined together to render the transverse connecting member to have a generally closed hollow, each end of the transverse connecting member being received from below into the respective arm portion and then connected thereto by the use of fastening means.

* * * * *